（12）United States Patent
Yang

(10) Patent No.: US 12,446,101 B2
(45) Date of Patent: Oct. 14, 2025

(54) COMMUNICATION PROCESSING METHOD AND APPARATUS, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 387 days.

(21) Appl. No.: 17/799,589

(22) PCT Filed: Feb. 13, 2020

(86) PCT No.: PCT/CN2020/075124
§ 371 (c)(1),
(2) Date: Aug. 12, 2022

(87) PCT Pub. No.: WO2021/159404
PCT Pub. Date: Aug. 19, 2021

(65) Prior Publication Data
US 2023/0068554 A1    Mar. 2, 2023

(51) Int. Cl.
*H04W 76/28*    (2018.01)
*H04W 72/20*    (2023.01)

(52) U.S. Cl.
CPC ........... *H04W 76/28* (2018.02); *H04W 72/20* (2023.01)

(58) Field of Classification Search
CPC ..... H04W 72/20; H04W 72/25; H04W 72/27; H04W 72/29; H04W 76/28; H04W 52/0216; H04W 52/0219; H04W 52/0229
See application file for complete search history.

(56) References Cited

U.S. PATENT DOCUMENTS

| | | | |
|---|---|---|---|
| 2019/0037534 A1 | 1/2019 | Yasukawa et al. | |
| 2020/0146082 A1* | 5/2020 | Chen | H04W 72/21 |
| 2020/0154511 A1* | 5/2020 | Pan | H04W 76/40 |
| 2020/0275425 A1* | 8/2020 | Cao | H04L 1/0003 |
| 2021/0051646 A1* | 2/2021 | Maaref | H04W 72/02 |
| 2021/0059005 A1* | 2/2021 | Hosseini | H04W 76/11 |
| 2021/0227465 A1* | 7/2021 | Kung | H04W 52/0216 |
| 2022/0346181 A1* | 10/2022 | Lu | H04W 52/0258 |
| 2022/0353945 A1* | 11/2022 | Liu | H04W 76/28 |
| 2022/0394810 A1* | 12/2022 | Hong | H04L 1/1883 |
| 2023/0063472 A1* | 3/2023 | Freda | H04W 76/28 |

(Continued)

FOREIGN PATENT DOCUMENTS

| | | |
|---|---|---|
| CN | 105917731 A | 8/2016 |
| CN | 107241786 A | 10/2017 |

(Continued)

OTHER PUBLICATIONS

PCT/CN2020/075124 English translation of International Search Report dated Aug. 20, 2020, 2 pages.

(Continued)

*Primary Examiner* — Stephen J Clawson
(74) *Attorney, Agent, or Firm* — Cozen O'Connor

(57) ABSTRACT

A communication processing method performed by a first user equipment (UE) includes: receiving one or more sets of discontinuous reception (DRX) configuration information; and monitoring a sidelink resource pool in a running period of a timer of each set of DRX configuration information.

18 Claims, 4 Drawing Sheets

(56) References Cited

U.S. PATENT DOCUMENTS

2023/0199905 A1* 6/2023 Liang ................ H04W 52/0235
    455/574
2023/0247553 A1* 8/2023 Zheng .................. H04W 76/28
    370/311

FOREIGN PATENT DOCUMENTS

| CN | 108307489 A | 7/2018 |
|---|---|---|
| EP | 3499975 A1 | 6/2019 |
| EP | 3855862 A1 | 7/2021 |
| WO | WO 2018064477 A1 | 4/2018 |

OTHER PUBLICATIONS

ZTE "Discussion on PC5 connection establishment and maintenance"; 3GPP TSG-RAN WG2 Meeting #97 R2-1700794; Feb. 2017; 4 pages.

Intel Corporation, ITL "DRX in Sidelink" 3GPP TSG RAN WG2#97 R2-1701309; Feb. 2017, 2 pages.

Indian Patent Application No. 202247050919, Office Action dated Jul. 20, 2023, 6 pages.

Indian Patent Application No. 202247050919, Office Action dated Sep. 11, 2024, 3 pages.

* cited by examiner

COMMUNICATION PROCESSING METHOD AND APPARATUS, AND STORAGE MEDIUM

CROSS-REFERENCE TO RELATED APPLICATION

This application is a U.S. national phase application of International Application No. PCT/CN2020/075124, filed on Feb. 13, 2020, the content of which is hereby incorporated by reference in its entirety for all purposes.

TECHNICAL FIELD

The disclosure relates to a field of communication technologies, and more particularly, to a communication processing method, device, and storage medium.

BACKGROUND

In order to support direct communication between the user equipment (UE), a sidelink communication mode is introduced. According to the correspondence between the sending UE and the receiving UE, three transmission modes are supported by the sidelink, i.e., unicast, multicast and broadcast. The sending UE sends Sidelink Control Information (SCI) on the Physical Sidelink Control Channel (PSCCH). The SCI contains information, such as resource locations, source identifier and target identifier of the transmitted data. After receiving the SCI, the receiving UE determines whether to receive the corresponding data based on the source identifier and destination identifier.

SUMMARY

According to a first aspect of embodiments of the disclosure, there is provided a communication processing method, performed by first user equipment (UE), including:
    receiving one or more sets of discontinuous reception (DRX) configuration information; and
    monitoring a sidelink resource pool during a running period of a timer of each set of the DRX configuration information.
According to a second aspect of embodiments of the disclosure, there is provided a communication processing method, including:
    determining one or more sets of discontinuous reception (DRX) configuration information corresponding to first user equipment (UE); wherein the DRX configuration information is configured to indicate the first UE to monitor a sidelink resource pool during a running period of a timer of each set of the DRX configuration information; and
    sending the DRX configuration information to the first UE.
According to a third aspect of embodiments of the disclosure, there is provided a communication processing device, including:
    a processor; and
    a memory for storing processor-executable instructions; in which the processor is configured to perform any one of the above-mentioned communication processing methods performed by the first UE when executing the executable instructions.
According to a fourth aspect of embodiments of the disclosure, there is provided a communication processing device, including:
    a processor; and
    a memory, for storing processor-executable instructions; in which the processor is configured to perform any one of the above-mentioned communication processing methods performed by the network device or the second UE when executing the executable instructions.

It should be understood that the foregoing general description and the following detailed description are examples and are explanatory only and are not limitations of the embodiments of the disclosure.

BRIEF DESCRIPTION OF THE DRAWINGS

The accompanying drawings, which are incorporated in and constitute a part of this specification, illustrate embodiments consistent with the disclosure and serve to explain the principles of the embodiments of the disclosure together with the description.

DETAILED DESCRIPTION

Embodiments will be described in detail herein, examples of which are illustrated in the accompanying drawings. In the following description related to the drawings, the same numerals in different drawings refer to the same or similar elements unless otherwise indicated. The implementations described in the following embodiments do not represent all implementations consistent with embodiments of the disclosure. Rather, they are merely examples of apparatus and methods consistent with some aspects of embodiments of the disclosure as recited in the appended claims.

The terms used in the embodiments of the disclosure are only for the purpose of describing particular embodiments, and are not intended to limit the embodiments of the disclosure. As used in the embodiments of the description and the appended claims, the singular forms "a," "an," and "said" are intended to include the plural forms as well, unless the context clearly dictates otherwise. It is understandable that the term "and/or" as used herein refers to and includes any one and all possible combinations of one or more of the associated listed items.

It is understandable that although the terms first, second, third, etc. may be used in embodiments of the disclosure to describe various pieces of information, such information should not be limited to these terms. These terms are only used to distinguish the same type of information from each other. For example, the first information may also be referred to as the second information, and similarly, the second information may also be referred to as the first information without departing from the scope of the embodiments of the disclosure. Depending on the context, the word "if" as used herein can be interpreted as "at the time of" or "when" or "in response to determining."

Figure 1:
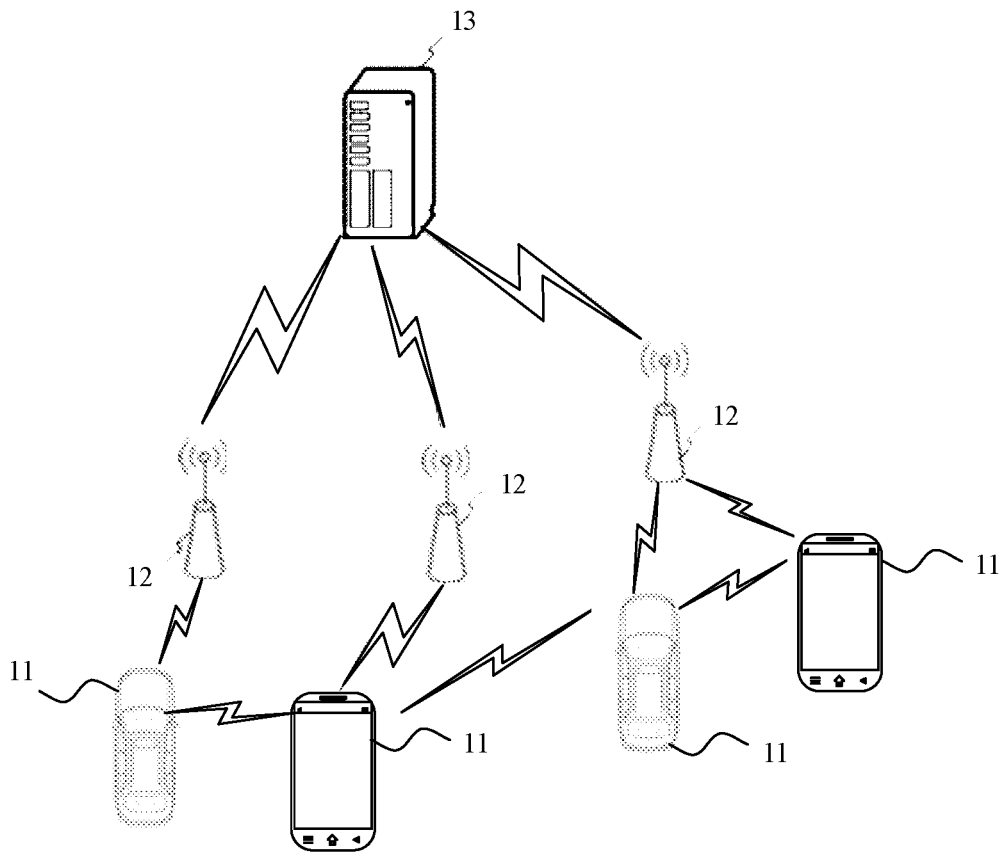
FIG. 1 is a schematic diagram illustrating a wireless communication system in accordance with an embodiment of the disclosure.

FIG. 1 is a schematic diagram illustrating a wireless communication system in accordance with an embodiment of the disclosure. As illustrated in FIG. 1, the wireless communication system is a communication system based on the cellular mobile communication technology. The wireless communication system may include several terminals 11 and several base stations 12.

The terminal 11 may be a device that provides voice and/or data connectivity to the user. The terminal 11 may communicate with one or more core networks via a Radio Access Network (RAN). The terminal 11 may be an Internet of Thing (IoT) terminal, such as a sensor device, a mobile phone (or "cellular" phone), or a computer with an IoT terminal, such as a fixed device, a portable device, a pocket device, a hand-held device, a computer built-in device or a vehicle-mounted device. For example, Station (STA), subscriber unit, subscriber station, mobile station, mobile, remote station, access point, remote terminal, access terminal, user terminal, user agent, user device, or user equipment (UE). Alternatively, the terminal 11 may be a device of unmanned aerial vehicle. Alternatively, the terminal 11 may be a vehicle-mounted device, such as a trip computer with a wireless communication function, or a wireless communication device externally connected to the trip computer. Alternatively, the terminal 11 may be a roadside device, such as a street light, a traffic light, or other roadside devices with a wireless communication function.

The base station 12 may be a network-side device in the wireless communication system. The wireless communication system may be the 4th generation mobile communication (4G) system, also known as Long Term Evolution (LTE) system. Alternatively, the wireless communication system may be a 5th generation mobile communication (5G) system, also known as new radio (NR) system or 5G NR system. Alternatively, the wireless communication system may be a next-generation system of the 5G system. The access network in the 5G system may be called New Generation-Radio Access Network (NG-RAN). Alternatively, the wireless communication system can be a Machine Type Communication (MTC) system.

The base station 12 may be an evolved base station (eNB) of the 4G system. Alternatively, the base station 12 may be a base station (gNB) that adopts a centralized-distributed architecture of the 5G system. When adopting the centralized-distributed architecture, the base station 12 usually includes a central unit (CU) and at least two distributed units (DU). The central unit is provided with a protocol stack of Packet Data Convergence Protocol (PDCP), Radio Link Control (RLC), and Medium Access Control (MAC). The distributed unit is provided with a protocol stack of a physical (PHY) layer. Embodiments of the disclosure not limit the implementation form of the base station 12.

A radio connection can be established between the base station 12 and the terminal 11 through the radio air interface. In different implementations, the radio air interface can be based on the 4G or based on 5G. For example, the radio air interface or the new radio, or the radio air interface can be a radio air interface based on the next-generation of the 5G.

In some embodiments, an E2E (End to End) connection can be established between terminals 11. For example, Vehicle to Vehicle (V2V) communication, Vehicle to Infrastructure (V2I) and Vehicle to Pedestrian (V2P) communication in the Vehicle to Everything (V2X) communication.

In some embodiments, the above wireless communication system may also include a network management device 13.

The base stations 12 are respectively connected to the network management device 13. The network management device 13 may be a core network device in the wireless communication system. For example, the network management device 13 may be a Mobility Management Entity (MME) in an Evolved Packet Core (EPC). Alternatively, the network management device can be other core network devices, such as Serving Gate Way (SGW), Public Data Network Gate Way (PGW), Policy and Charging Rules Function (PCRF), or Home Subscriber Server (HSS), etc. Embodiments of the disclosure do not limit the implementation form of the network management device 13.

In order to support the direct communication between UE and UE, the sidelink communication mode is introduced, and the interface between the UE and the UE is PC-5. According to the correspondence between the sending UE and the receiving UE, three transmission modes related to the sidelink are supported, i.e., unicast, multicast and broadcast. The sending UE sends Sidelink Control Information (SCI) on the Physical Sidelink Control Channel (PSCCH) channel, and the SCI contains resource locations, a source identifier, and a destination identifier of transmitted data. After receiving the SCI, the receiving UE determines, based on the source identifier and the destination identifier contained in the SCI, whether to receive the corresponding data and which process corresponds thereto. In the unicast connection, each UE corresponds to an individual destination identifier. In the multicast, each UE can belong to a respective group, and each group corresponds to an individual destination identifier. In the broadcast, all UEs correspond to one destination identifier.

The network can configure one or more sidelink resource pools for the UE through broadcast or dedicated signaling, for sending the SCI and data. The sidelink resource pools are radio resources that are continuous in the frequency domain and continuous or discontinuous in the time domain.

On the air interface (also known as the Uu interface), in order to save the power consumption of the UE, the network can configure Discontinuous Reception (DRX) for the UE. The DRX configuration includes inactivity timer, on-duration timer, cycle and initial offset, etc. The UE may monitor the Physical Downlink Control Channel (PDCCH) channel while the inactivity timer is on and during the on duration of the on-duration timer, and the UE may not monitor the PDCCH channel at other times, thereby saving power consumption. Whenever the UE receives the Downlink Control Information (DCI) carrying its Cell-Radio Network Temporary Identifier (C-RNTI) on the PDCCH, the inactivity timer is started. The UE may also periodically start the on-duration timer.

Currently, the UE needs to monitor the PSCCH channel all the time to obtain the SCI and the data transmission, resulting in serious power consumption.

Based on the above wireless communication system, in view of how to reduce the power consumption of the UE, methods according to embodiments of the disclosure are provided.

Figure 2:
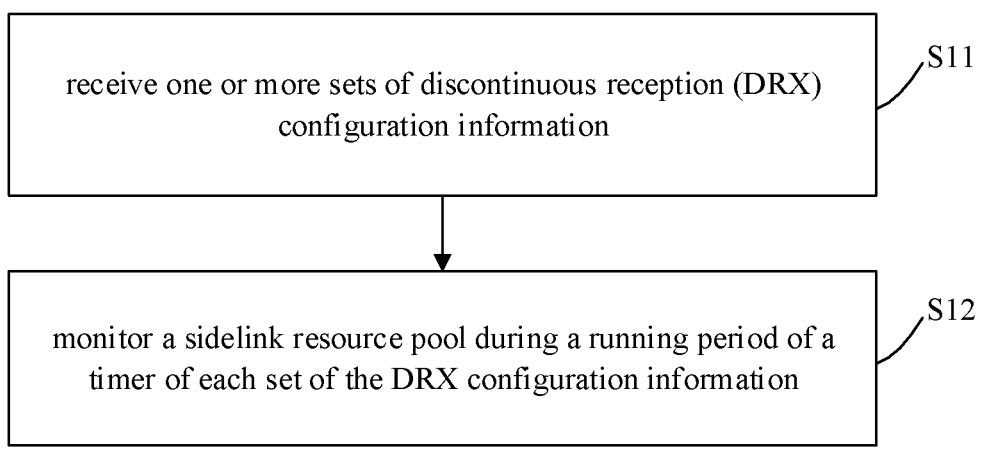
FIG. 2 is a first flowchart illustrating a communication processing method in accordance with an embodiment of the disclosure.

FIG. 2 is a first flowchart illustrating a communication processing method in accordance with an embodiment. As illustrated in FIG. 2, the communication processing method is performed by the UE, such as a first UE. The method includes the following.

In block S11, one or more sets of discontinuous reception (DRX) configuration information are received.

In block S12, during a running period of a timer of each set of the DRX configuration information, one or more sidelink resource pools are monitored.

In embodiments of the disclosure, the sidelink resource pool comprises Physical Sidelink Control Channel (PSCCH).

In embodiments of the disclosure, the DRX configuration information may be configured for the first UE by a network device, may be configured for the first UE by a second UE, or may be configured for the first UE by the network device and sent to the first UE by the second UE. The second UE is a device capable of communicating with the first UE. In an embodiment of the disclosure, the network device may be a base station. Certainly, the network device may also be any device capable of communicating with the first UE and/or the second UE.

In implementations of the disclosure, the timer includes an on-duration timer and/or an inactivity timer.

In embodiments of the disclosure, each set of the DRX configuration information at least includes at least one of the following: DRX cycle, duration information of the on-duration timer, and duration information of the inactivity timer.

In embodiments of the disclosure, each set of the DRX configuration information at least further includes at least one of the following: one or more source identifiers, one or more destination identifiers, sidelink transmission mode information, and sidelink resource pool information of one or more sidelink resource pools.

The sidelink resource pool information is identifier information or resource location information of the one or more sidelink resource pools. The resource location information includes time domain resource location information and frequency domain resource location information.

With the technical solution according to embodiments of the disclosure, the one or more sets of DRX configuration information sent by the network device or the second UE are received, and the one or more sidelink resource pools are monitored during the running period of the timer of each set of the DRX configuration information. In this way, compared to monitoring the sidelink resource pool(s) all the time, the first UE monitors the sidelink resource pool(s) during the running period of the timer, which can save the power consumption of the first UE.

In some embodiments, the DRX configuration information includes the DRX cycle, the sidelink resource pool information, and the duration information of the on-duration timer. The duration information of the on-duration timer indicates a running duration of the on-duration timer. The method further includes: starting the on-duration timer at the beginning of the DRX cycle. Monitoring the sidelink resource pool(s) during the running period of the timer of each set of the DRX configuration information includes: during the running period of the on-duration timer, monitoring the sidelink resource pool(s) indicated by the sidelink resource pool information.

In this way, compared to monitoring the sidelink resource pool(s) all the time, the first UE monitors the sidelink resource pool(s) during the running period of the on-duration timer, which can save the power consumption of the first UE. In addition, compared to monitoring all configured sidelink resource pools, monitoring the sidelink resource pool(s) indicated by the sidelink resource pool information can further save the power consumption of the first UE.

In some embodiments, the DRX configuration information includes the duration information of the inactivity timer, the sidelink resource pool information, the source identifier and the destination identifier. The duration information of the inactivity timer indicates the running duration of the inactive timer. The method further includes: determining a source UE identifier and/or a destination UE identifier contained in the received signaling (e.g. the SCI); in response to determining that the source UE identifier contained in the signaling (e.g. the SCI) is the same as the source identifier configured by the first UE and the destination identifier contained in the signaling (e.g. the SCI) is the same as the destination UE identifier configured by the first UE, starting the inactivity timer. Monitoring the sidelink resource pool(s) during the running period of the timer of each set of the DRX configuration information includes: during the running period of the inactivity timer, monitoring the sidelink resource pool(s) indicated by the sidelink resource pool information.

In this way, compared to monitoring the sidelink resource pool(s) all the time, the first UE monitors the sidelink resource pool(s) during the running periods of the on-duration timer and the inactivity timer, which can save the power consumption of the first UE. In addition, when the signaling (e.g., the SCI) containing the source identifier that is used as the source UE identifier and the destination identifier that is used as the destination UE identifier is received, the inactivity timer is started. Furthermore, compared to monitoring all configured sidelink resource pools, monitoring the sidelink resource pool(s) indicated by the sidelink resource pool information can further save the power consumption of the first UE.

In all embodiments of the disclosure, the signaling containing the destination identifier that is used as the destination UE identifier may be the SCI or any other signaling.

In some embodiments, the DRX configuration information includes the duration information of the inactivity timer, the sidelink resource pool information and the destination identifier. The duration information of the inactivity timer indicates the running duration of the inactivity timer. The method further includes: the DRX configuration information not including a source identifier, determining, by the first UE, the source UE identifier and/or the destination UE identifier contained in the received signaling (e.g. the SCI); in response to determining that the source UE identifier contained in the received signaling (e.g. the SCI) is the same as the source identifier configured by the first UE, starting the inactivity timer. Monitoring the sidelink resource pool(s) during the running period of the timer of each set of DRX configuration information includes: during the running period of the inactivity timer, monitoring the sidelink resource pool(s) indicated by the sidelink resource pool information.

In this way, compared to monitoring the sidelink resource pools all the time, the first UE monitors the sidelink resource pool(s) during the running periods of the on-duration timer and the inactivity timer, which can save the power consumption of the first UE. In addition, in the case where the DRX configuration information does not include any source identifier, in response to receiving the signaling (e.g. the SCI) containing the destination identifier that is used as the destination UE identifier, the inactivity timer is started. Furthermore, compared to monitoring all configured sidelink resource pools, monitoring the sidelink resource pool(s) indicated by the sidelink resource pool can further save power consumption of the first UE.

In some embodiments, the DRX configuration information includes the duration information of the inactivity timer, the source identifier and the sidelink resource pool information. The duration information of the inactivity timer indicates the running duration of the inactivity timer. The method further includes: the DRX configuration information not including any destination identifier, determining by the first UE the source UE identifier and/or the destination UE identifier contained in the received signaling (e.g. the SCI); in response to determining that the destination UE identifier contained in the received signaling (e.g. the SCI) and the destination identifier configured by the first UE are the same, starting the inactivity timer. During the running period of the timer of each set of the DRX configuration information, monitoring the sidelink resource pool(s) includes during the running period of the inactivity timer, monitoring the sidelink resource pool(s) indicated by the sidelink resource pool information.

In this way, compared to monitoring the sidelink resource pool(s) all the time, the first UE monitors the sidelink resource pool(s) during the running periods of the on-duration timer and the inactivity timer, which can save the power consumption of the first UE. In addition, in the case that the DRX configuration information does not include any destination identifier, in response to receiving the SCI containing the source UE identifier that is the same as the source identifier and the destination UE identifier that is the same as any one of destination identifiers configured by the first UE, starting the inactivity timer. Furthermore, compared to monitoring all configured sidelink resource pools, monitoring the sidelink resource pool(s) indicated by the sidelink resource pool information can further save the power consumption of the first UE.

In some embodiments, the DRX configuration information includes the duration information of the inactivity timer and the sidelink resource pool information. The duration information of the inactivity timer indicates the running duration of the inactivity timer. The method further includes: the DRX configuration information not including any source identifier or any destination identifier, determining by the first UE the source UE identifier and/or the destination UE identifier contained in the received signaling (e.g. the SCI); in response to determining that the destination UE identifier contained in the received signaling (e.g. the SCI) is the same as any one destination identifier configured by the first UE, starting the inactivity timer. During the running period of the timer of each set of the DRX configuration information, monitoring the sidelink resource pool(s) includes: during the running period of the inactivity timer, monitoring the sidelink resource pool(s) indicated by the sidelink resource pool information.

In this way, compared to monitoring the sidelink resource pool(s) all the time, the first UE monitors the sidelink resource pool(s) during the running periods of the on-duration timer and the inactivity timer, which can save the power consumption of the first UE. In addition, in the case that the DRX configuration information does not include any source identifier or any destination identifier, in response to receiving the signaling (e.g., the SCI) containing the destination UE identifier that is the same as any destination identifier configured by the first UE, the inactivity timer is started. Furthermore, compared to monitoring all configured sidelink resource pools, monitoring the sidelink resource pool(s) indicated by the sidelink resource pool information can further save the power consumption of the first UE.

In some embodiments, the DRX configuration information includes the duration information of the on-duration timer and the duration information of the inactivity timer. The duration information of the on-duration timer indicates the running duration of the on-duration timer. The duration information of the inactivity timer indicates the running duration of the inactivity timer. Monitoring the sidelink resource pool(s) during the running period of the timer of each set of the DRX configuration information includes: the DRX configuration information including the sidelink resource pool information, and monitoring the sidelink resource pool(s) indicated by the sidelink resource pool information during the running periods of the on-duration timer and the inactivity timer.

In some embodiments, the DRX configuration information includes the duration information of the on-duration timer and the duration information of the inactivity timer. The duration information of the on-duration timer indicates the running duration of the on-duration timer. The duration information of the inactivity timer indicates the running duration of the inactivity timer. Monitoring the sidelink resource pool(s) during the running period of the timer of each set of the DRX configuration information includes: the DRX configuration information not including any sidelink resource pool information, and monitoring all configured sidelink resource pools during the running periods of the on-duration timer and the activity timer.

In this way, compared to monitoring the sidelink resource pool(s) all the time, the first UE monitors the sidelink resource pool(s) during the running periods of the on-duration timer and the inactivity timer, which can save the power consumption of the first UE. In addition, compared to monitoring all configured sidelink resource pools, in the case that the DRX configuration information includes the sidelink resource pool information, monitoring the sidelink resource pool(s) indicated by the sidelink resource pool information can further save the power consumption of the first UE.

In some embodiments, the DRX configuration information includes the duration information of the inactivity timer, the sidelink resource pool information, and the sidelink transmission mode information. The method further includes: in response to determining that the sidelink transmission mode indicated in the received signaling (e.g. the SCI) is the same as the sidelink transmission mode indicated by the DRX configuration information, starting the inactivity timer. Monitoring the sidelink resource pool(s) during the running period of the timer in each set of the DRX configuration information includes: during the running period of the inactivity timer, monitoring the sidelink resource pool(s) indicated by the sidelink resource pool information.

In this way, compared to monitoring the sidelink resource pool(s) all the time, the first UE monitors the sidelink resource pool(s) during the running periods of the on-duration timer and the inactivity timer, which can save the power consumption of the first UE. In addition, when the sidelink transmission mode indicated in the received signaling (e.g. the SCI) is the same as the sidelink transmission mode indicated by the DRX configuration information, the inactivity timer is started. In addition, compared to monitoring all configured sidelink resource pools, monitoring the sidelink resource pool(s) indicated by the sidelink resource pool information can further save the power consumption of the first UE.

In the above technical solutions, the method also includes: in response to determining that the timer is in an inactive state, not monitoring the sidelink resource pool(s).

In this way, when the timer is not running, the first UE does not monitor the sidelink resource pool(s), which can save the power consumption of the first UE.

In some embodiments, the method further includes: determining that the DRX contains the source identifier and the destination identifier; in response to determining that the source identifier is a third UE identifier of a third UE and the destination identifier is a first UE identifier of the first UE, forwarding the DRX to the third UE by the first UE. In some embodiments, the method further includes establishing a sidelink data transmission with the third UE during the running period of the timer.

In this way, it is convenient for the third UE to perform the sidelink data transmission with the first UE based on the DRX configuration information of the first UE, such that the data is transmitted to the first UE that is in a monitoring state at an appropriate time, thereby saving the power consumption without affecting communication.

Figure 3:
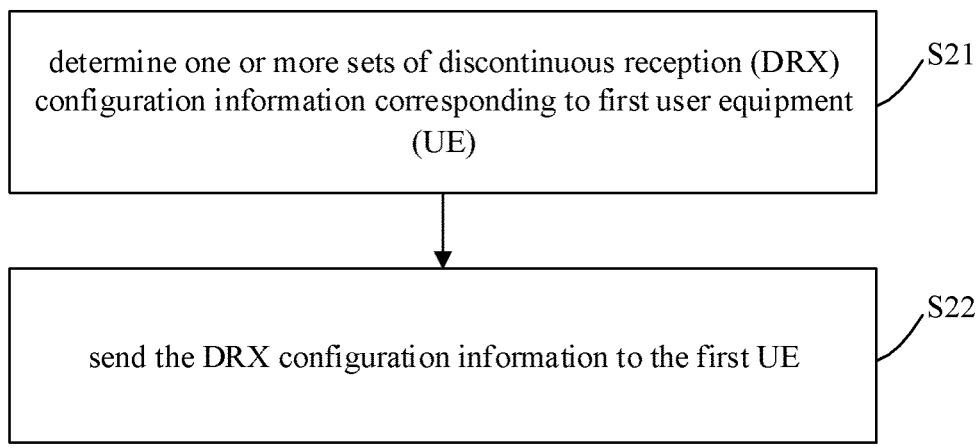
FIG. 3 is a second flowchart illustrating a communication processing method in accordance with an embodiment of the disclosure.

FIG. 3 is a second flowchart illustrating a communication processing method in accordance with an embodiment of the disclosure. As illustrated in FIG. 3, the communication processing method is performed by a network device capable of configuring the DRX information, or performed by the UE capable of configuring the DRX information. The method includes the following.

In block S21, one or more sets of discontinuous reception (DRX) configuration information corresponding to first user equipment (UE) are determined.

In block S22, the DRX configuration information is sent to the first UE.

The DRX configuration information may be configured for the first UE by the network device, may be configured for the first UE by a second UE, or may be configured for the first UE by the network device and sent to the first UE by the second UE. The second UE is a device capable of communicating with the first UE. In one embodiment, the network device may be a base station. Certainly, the network device may be any device capable of communicating with the first UE and/or the second UE.

In implementations of the disclosure, the timer includes an on-duration timer and/or an inactivity timer.

In embodiments of the disclosure, each set of the DRX configuration information at least includes at least one of the following: DRX cycle; duration information of the on-duration timer; and duration information of the inactivity timer.

In embodiments of the disclosure, each set of the DRX configuration information at least further includes at least one of the following: one or more source identifiers; one or more destination identifiers; sidelink transmission mode information; and sidelink resource pool information of one or more sidelink resource pools.

The sidelink resource pool information is identifier information or resource location information of the one or more sidelink resource pools. The resource location information includes time domain resource location information and frequency domain resource location information.

With the communication processing method according to embodiments of the disclosure, the one or more sets of DRX configuration information are configured for the first UE and the DRX configuration information is sent to the first UE, such that the first UE monitors, based on each set of the DRX configuration information, the sidelink resource pool(s) during the running period of the timer of each set of the DRX configuration information, which can save the power consumption of the first UE.

In some embodiments, the DRX configuration information includes the DRX cycle, the sidelink resource pool information, and the duration information of the on-duration timer. The duration information of the on-duration timer indicates a running duration of the on-duration timer.

In this way, it is convenient for the first UE to monitor, based on the DRX configuration information, the sidelink resource pool(s) during the running period of the on-duration timer, which can save the power consumption of the first UE. In addition, since the sidelink resource pool information is configured, compared to monitoring all configured sidelink resource pools, the sidelink resource pool(s) indicated by the sidelink resource pool information are monitored during the running period of the on-duration timer, which can further save the power consumption of the first UE.

In some embodiments, the DRX configuration information includes the duration information of the inactivity timer, the sidelink resource pool information, the source identifier, and the destination identifier. The duration information of the inactivity timer indicates the running duration of the inactivity timer.

In this way, it is convenient for the first UE to monitor, based on the DRX configuration information, the sidelink resource pool(s) during the running period of the inactivity timer, which can save the power consumption of the first UE. In addition, in response to receiving the SCI containing the source UE identifier that is the same as the source identifier and the destination UE identifier that is the same as the destination identifier, the first UE starts the inactivity timer and monitors the sidelink resource pool(s) indicated by the sidelink resource pool information during the running period of the inactivity timer, which can further save the power consumption of the first UE.

In some embodiments, the DRX configuration information includes the duration information of the inactivity timer, the sidelink resource pool information and the destination identifier. The duration information of the inactivity timer indicates the running duration of the inactivity timer.

In this way, it is convenient for the first UE to monitor, based on the DRX configuration information, the sidelink resource pool(s) during the running period of the inactivity timer, which can save the power consumption of the first UE. In addition, in the case that the DRX configuration information does not include any source identifier, in response to receiving the SCI containing the destination UE identifier that is the same as the destination identifier, the first UE starts the inactivity timer and monitors the sidelink resource pool(s) indicated by the sidelink resource pool information during the running period of the inactivity timer, which can further save of the power consumption of the first UE.

In some embodiments, the DRX configuration information includes the duration information of the inactivity timer, the source identifier and the sidelink resource pool information. The duration information of the inactivity timer indicates the running duration of the inactivity timer.

In this way, it is convenient for the first UE to monitor, based on the DRX configuration information, the sidelink resource pool(s) during the running period of the inactivity timer, which can save the power consumption of the first UE. In addition, in the case that the DRX configuration information does not include any destination identifier, in response to receiving the SCI containing the source UE identifier that is the same as the source identifier and the destination UE identifier that is the same as any destination identifier of the first UE, the inactivity timer is started and the sidelink resource pool(s) indicated by the sidelink resource pool information are monitored during the running period of the inactivity timer, which can further save the power consumption of the first UE.

In some embodiments, the DRX configuration information includes the duration information of the inactivity timer and the sidelink resource pool information. The duration information of the inactivity timer indicates the running duration of the inactivity timer.

In this way, it is convenient for the first UE to monitor, based on the DRX configuration information, the sidelink resource pool(s) during the running period of the inactivity timer, which can save the power consumption of the first UE. In addition, in the case that the DRX configuration information does not include any source identifier or any destination identifier, in response to receiving the SCI containing the destination UE identifier that is the same as any destination identifier of the first UE, the first UE starts the inactivity timer and monitors the sidelink resource pool(s) indicated by the sidelink resource pool information during the running period of the inactivity timer, which can further save the power consumption of the first UE.

In some embodiments, the DRX configuration information includes the duration information of the on-duration timer and the duration information of the inactivity timer.

In this way, it is convenient for the first UE to monitor, based on the DRX configuration information, the sidelink resource pool(s) during the running periods of the on-duration timer and the inactivity timer, which can save the power consumption of the first UE. In addition, in the case that the DRX configuration information includes the sidelink resource pool information, the first UE monitors the sidelink resource pool(s) indicated by the sidelink resource pool information during the running periods of the on-duration timer and the inactivity timer, which can further save the power consumption of the first UE.

In some embodiments, the DRX configuration information includes the duration information of the inactivity timer, the sidelink resource pool information, and the sidelink transmission mode information.

In this way, it is convenient for the first UE to monitor, based on the DRX configuration information, the sidelink resource pool(s) during the running period of the inactivity timer, which can save the power consumption of the first UE. In addition, compared to monitoring all configured sidelink resource pools, when the sidelink transmission mode indicated in the SCI received by the first UE is the same as the sidelink transmission mode indicated by the DRX configuration information, the first UE starts the inactivity timer. Furthermore, monitoring the sidelink resource pool(s) indicated by the sidelink resource pool information during the running period of the inactivity timer can further save the power consumption of the first UE.

All embodiments of the disclosure are illustrated by the following example.

In this example, the identifier of the UE a is 01, the identifier of the UE b is 02, the identifier of the UE c is 03. The UE a has established the sidelink unicast connection with the UE b, and the UE b has established the sidelink unicast connection with the UE c. The destination identifier broadcasted by the base station is 11, and the broadcast message carries two sidelink sending resource pools.

Specifically, one sidelink sending resource pool having a sidelink resource pool identifier being 1 is: PRB 1 to PRB 150; subframes 1, 2, 3, 5, 6, and 7. The other sidelink sending resource pool having a sidelink resource pool identifier being 2 is: PRB 200 to PRB 300; subframes 5, 8. The base station configures the DRX configuration information for the UE a based on service attributes. Specifically, the first set of DRX configuration information includes: the inactivity timer 3 ms, the on-duration timer 2 ms, the cycle 5 ms, the initial offset 0 ms, the source identifier being 02, the destination identifier being 01, and the sidelink resource pool identifier being 1. The second set of DRX configuration information includes: the inactivity timer 5 ms, the on-duration timer 1 ms, the cycle 10 ms, the initial offset 5 ms, the destination identifier being 11, and the sidelink resource pool being PRB 200 to PRB 250. The third set of DRX configuration information includes: the inactive timer 5 ms, the on-duration timer 1 ms, the cycle 10 ms, the initial offset 2 ms, the sidelink transmission mode multicast, and the sidelink resource pool being PRB 300 to PRB 350.

Based on the first set of DRX configuration information, the UE a sends the first set of DRX configuration information to the UE b, and the UE a starts the on-duration timer every 5 ms and monitors the sidelink resource pool indicated by PRB 1 to PRB 150. When the SCI containing the source identifier being 02 and the destination identifier being 01 is received, the inactive timer is started, and the sidelink resource pool indicated by PRB 1 to PRB 150 is monitored.

Based on the second set of DRX configuration information, the UE a starts the on-duration timer every 10 ms and monitors the sidelink resource pool indicated by PRB 200 to PRB 250. When the SCI containing the destination identifier being 11 is received, the inactive timer is started and the sidelink resource pool indicated by PRB 200 to PRB 250 is monitored.

Based on the third set of DRX configuration information, the UE a starts the on-duration timer every 10 ms and monitors the sidelink resource pool indicated by PRB 300 to PRB 350. When the multicast SCI is obtained, the sidelink resource pool indicated by PRB 300 to PRB 350 is monitored.

It is to be noted that this process and the DRX configuration information are schematic, and can be set or adjusted according to actual conditions or design requirements.

Figure 4:
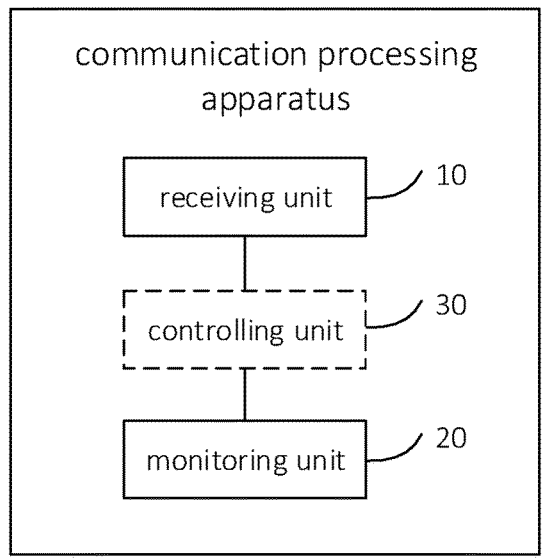
FIG. 4 is a first block diagram illustrating a communication processing apparatus in accordance with an embodiment of the disclosure.

FIG. 4 is a first block diagram illustrating a communication processing apparatus in accordance with an embodiment of the disclosure. The communication processing apparatus is applied to a first UE side. As illustrated in FIG. 4, the apparatus includes a receiving unit 10 and a monitoring unit 20.

The receiving unit 10 is configured to receive one or more sets of discontinuous reception (DRX) configuration information.

The monitoring unit 20 is configured to monitor one or more sidelink resource pools during a running period of a timer of each set of the DRX configuration information.

In some embodiments, the apparatus further includes a controlling unit 30.

The controlling unit 30 is configured to start the timer.

In implementations of the disclosure, the timer includes an on-duration timer and/or an inactivity timer.

In embodiments of the disclosure, each set of the DRX configuration information at least includes at least one of following parameters: DRX cycle; duration information of the on-duration timer; duration information of the inactivity timer.

In embodiments of the disclosure, each set of the DRX configuration information at least further includes at least one of the following: one or more source identifiers; one or more destination identifiers; sidelink transmission mode information; and sidelink resource pool information of the one or more sidelink resource pools.

The controlling unit 30 is configured to start the on-duration timer at a beginning of the DRX cycle.

The monitoring unit 20 is configured to monitor the sidelink resource pool(s) indicated by the sidelink resource pool information during the running period of the on-duration timer.

In some embodiments, the DRX configuration information includes duration information of the inactivity timer, sidelink resource pool information, a source identifier and a destination identifier. The duration information of the inactivity timer indicates a running duration of the inactivity timer;

The controlling unit 30 is configured to: determine a source UE identifier and/or a destination UE identifier contained in a received signaling (such as the SCI), in response to determining that the source UE identifier contained in the signaling (such as the SCI) is the same as the source identifier configured by the first UE and the destination UE identifier contained in the signaling (e.g. the SCI) is the same as the destination identifier configured by the first UE, start the inactivity timer.

The monitoring unit 20 is configured to monitor the sidelink resource pool(s) indicated by the sidelink resource pool information during a running period of the inactivity timer.

In some embodiments, the DRX configuration information includes the duration information of the inactivity timer, the sidelink resource pool information and the destination identifier. The duration information of the inactivity timer indicates a running duration of the inactivity timer.

The controlling unit 30 is configured to: determine a source UE identifier and/or a destination UE identifier contained in the received signaling (e.g. the SCI); and in response to determining that the source UE identifier contained in the received signaling (e.g. the SCI) is the same as the source identifier configured by the first UE, start the inactivity timer, in which the DRX configuration information not including the source identifier.

The monitoring unit 20 is configured to: monitor the sidelink resource pool(s) indicated by the sidelink resource pool information during the running period of the inactivity timer.

In some embodiments, the DRX configuration information includes the duration information of the inactive timer, the source identifier and the sidelink resource pool information. The duration information of the inactivity timer indicates the running duration of the inactivity timer.

The controlling unit 30 is configured to: determine the source UE identifier and/or the destination UE identifier contained in the received signaling (e.g. the SCI), and in response to determining that the destination UE identifier contained in the received signaling (e.g. the SCI) is the same as the destination identifier configured by the first UE, start the inactivity timer, in which the DRX configuration information does not include any destination identifier.

The monitoring unit 20 is configured to: during the running period of the inactivity timer, monitor the sidelink resource pool(s) indicated by the sidelink resource pool information.

In some embodiments, the DRX configuration information includes duration information of an inactivity timer and the sidelink resource pool information. The duration information of the inactivity timer indicates a running duration of the inactivity timer.

The controlling unit 30 is configured to: determine the source UE identifier and/or the destination UE identifier contained in the received signaling (e.g. the SCI); and in response to determining that the destination UE identifier contained in the received signaling (e.g. the SCI) is the same as any one of destination identifiers configured by the first UE, start the inactivity timer, in which the DRX configuration information does not include any source identifier or any destination identifier.

The monitoring unit 20 is configured to monitor the sidelink resource pool(s) indicated by the sidelink resource pool information during the running period of the inactivity timer.

In some embodiments, the DRX configuration information includes duration information of an on-duration timer and duration information of an inactivity timer. The duration information of the on-duration timer indicates a running duration of the on-duration timer, and the duration information of the inactivity timer indicates a running duration of the inactivity timer.

The monitoring unit 20 is configured to monitor the sidelink resource pool(s) indicated by the sidelink resource pool information during running periods of the on-duration timer and the inactivity timer, in which the DRX configuration information includes the sidelink resource pool information.

In some embodiments, the DRX configuration information includes duration information of an on-duration timer and duration information of an inactivity timer. The duration information of the on-duration timer indicates a running duration of the on-duration timer, and the duration information of the inactivity timer indicates a running duration of the inactivity timer.

The monitoring unit 20 is configured to monitor all configured sidelink resource pools during the running periods of the on-duration timer and the inactivity timer, in which the DRX configuration information does not include the sidelink resource pool information.

In some embodiments, the DRX configuration information includes duration information of the inactivity timer, the sidelink resource pool information, and the sidelink transmission mode information.

The controlling unit 30 is configured to: in response to determining that the sidelink transmission mode indicated in the received signaling (e.g. the SCI) is the same as the sidelink transmission mode indicated by the DRX configuration information, start the inactivity timer.

The monitoring unit 20 is configured to: monitor the sidelink resource pool(s) indicated by the sidelink resource pool information during the running period of the inactivity timer.

In the above technical solutions, the sidelink resource pool information is identifier information or resource location information of the sidelink resource pool.

In the above technical solutions, the monitoring unit 20 is configured to not monitor the sidelink resource pool(s) in response to determining that the timer is not in a running state.

In some embodiments, the controlling unit 30 is further configured to forwarding the DRX configuration information to the third UE in response to using the source identifier as a source UE identifier of the third UE, in which the DRX configuration information includes the source identifier and the destination identifier.

In some embodiments, the controlling unit 30 is further configured to establishing a sidelink data transmission with the third UE during the running period of the timer.

Regarding the apparatus in the above-mentioned embodiment, the specific manner in which each module performs operations has been described in detail in the embodiment of the method, and will not be described in detail here.

In practical use, specific structures of the receiving unit 10, the monitoring unit 20 and the controlling unit 30 can be implemented as the central processing unit (CPU), the micro controller unit (MCU), the digital signal processing (DSP) or the programmable logic controller (PLC) in the communication processing device or the first UE to which the communication processing device belongs.

The communication processing apparatus described in embodiments may be disposed on the first UE side.

Those skilled in the art should understand that the functions of each processing module in the communication processing apparatus of the embodiments of the disclosure can be understood with reference to the foregoing description of the communication processing method performed by the side of the first UE. Each processing module may be implemented by an analog circuit that implements the functions described in the embodiments of the disclosure, or may be implemented by running software on a terminal that executes the functions described in the embodiments of the disclosure.

The communication processing apparatus described in the embodiments of the disclosure can save power consumption.

Embodiments of the disclosure further provide a communication processing device. The device includes: a memory, a processor, and a computer program stored on the memory and running on the processor. The processor is configured to perform any of the above-mentioned communication processing method performed by the first UE, when executing the program.

Embodiments of the disclosure further provide a computer storage medium, where computer-executable instructions are stored in the computer storage medium. The computer-executable instructions are used to execute the communication processing described in the foregoing embodiments performed by the first UE. That is, after the computer-executable instructions are executed by the processor, any one of the foregoing communication processing methods performed by the first UE can be implemented.

Those skilled in the art should understand that the functions of each program in the computer storage medium of this embodiment can be understood by referring to the relevant descriptions of the communication processing methods described in the foregoing embodiments.

Figure 5:
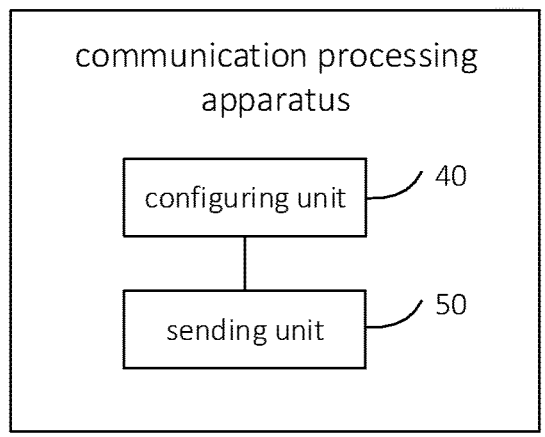
FIG. 5 is a second block diagram illustrating a communication processing apparatus in accordance with an embodiment of the disclosure.

FIG. 5 is a second block diagram illustrating a communication processing apparatus in accordance with an embodiment of the disclosure. The communication processing apparatus is arranged at the network device side or the second UE side. As illustrated in FIG. 5, the apparatus includes a configuring unit 40 and a sending unit 50.

The configuring unit 40 is configured to determine one or more sets of DRX configuration information corresponding to the first UE.

The sending unit 50 is configured to send the DRX configuration information to the first UE.

In implementations of the disclosure, the timer includes an on-duration timer and/or an inactivity timer.

In embodiments of the disclosure, each set of the DRX configuration information at least includes at least one of the following parameters: DRX cycle; duration information of the on-duration timer; and duration information of the inactivity timer.

In embodiments of the disclosure, each set of the DRX configuration information at least further includes at least one of the following parameters: one or more source identifiers; one or more destination identifiers; sidelink transmission mode information; sidelink resource pool information of one or more sidelink resource pools.

In some embodiments, the DRX configuration information includes the DRX cycle, the sidelink resource pool information and the duration information of the on-duration timer. The duration information of the on-duration timer indicates a running duration of the on-duration timer.

In some embodiments, the DRX configuration information includes the duration information of the inactivity timer, the sidelink resource pool information, the source identifier and the destination identifier. The duration information of the inactivity timer indicates a running duration of the inactivity timer.

In some embodiments, the DRX configuration information includes the duration information of the inactivity timer, the sidelink resource pool information and the destination identifier. The duration information of the inactivity timer indicates a running duration of the inactivity timer.

In some embodiments, the DRX configuration information includes the duration information of the inactivity timer, the source identifier and the sidelink resource pool information. The duration information of the inactivity timer indicates a running duration of the inactivity timer.

In some embodiments, the DRX configuration information includes the duration information of the inactivity timer and the sidelink resource pool information. The duration information of the inactivity timer indicates a running duration of the inactivity timer.

In some embodiments, the DRX configuration information includes the duration information of the on-duration timer and the duration information of the inactivity timer. The duration information of the on-duration timer indicates a running duration of the on-duration timer, and the duration information of the inactivity timer indicates a running duration of the inactivity timer.

In some embodiments, the DRX configuration information includes the duration information of the inactivity timer, the sidelink resource pool information, and sidelink transmission mode information.

In the above technical solutions, the sidelink resource pool information is identifier information or resource location information of the sidelink resource pool.

Regarding the apparatus in the above-mentioned embodiments, the specific manner in which each module performs operations has been described in detail in the embodiments of the method, and will not be described in detail here.

In practical use, the specific structures of the configuring unit 40 and the sending unit 50 can be implemented as the CPU, MCU, DSP, or PLC in the communication processing device or the second UE to which the communication processing device belongs.

The communication processing apparatus described in embodiments may be disposed on the network device side or the second UE side.

Those skilled in the art should understand that the functions of each processing module in the communication processing apparatus according to embodiments of the disclosure can be understood by referring to the foregoing description of the communication processing method applied to the network device side or the second UE side. Each processing module may be implemented by an analog circuit that implements the functions described in the embodiments of the disclosure, or may be implemented by running software on a terminal that executes the functions described in the embodiments of the disclosure.

The communication processing apparatus according to embodiments of the disclosure can configure DRX configuration information for the first UE, thereby saving power consumption of the first UE.

Embodiments of the disclosure further provide a communication processing device. The device includes: a memory, a processor, and a computer program stored in the memory and running on the processor. The processor is configured to perform any of the above-mentioned communication processing method performed by the network device or the second UE, when executing the program.

Embodiments of the disclosure further provide a computer storage medium, where computer-executable instructions are stored in the computer storage medium. The computer-executable instructions are used to execute the communication processing methods described in the foregoing embodiments. That is, after the computer-executable instructions are executed by the processor, any one of the foregoing communication processing methods performed by the network device or the second UE technical solution can be implemented.

Those skilled in the art should understand that the functions of each program in the computer storage medium of this embodiment can be understood by referring to the relevant descriptions of the communication processing methods described in the foregoing embodiments.

Figure 6:
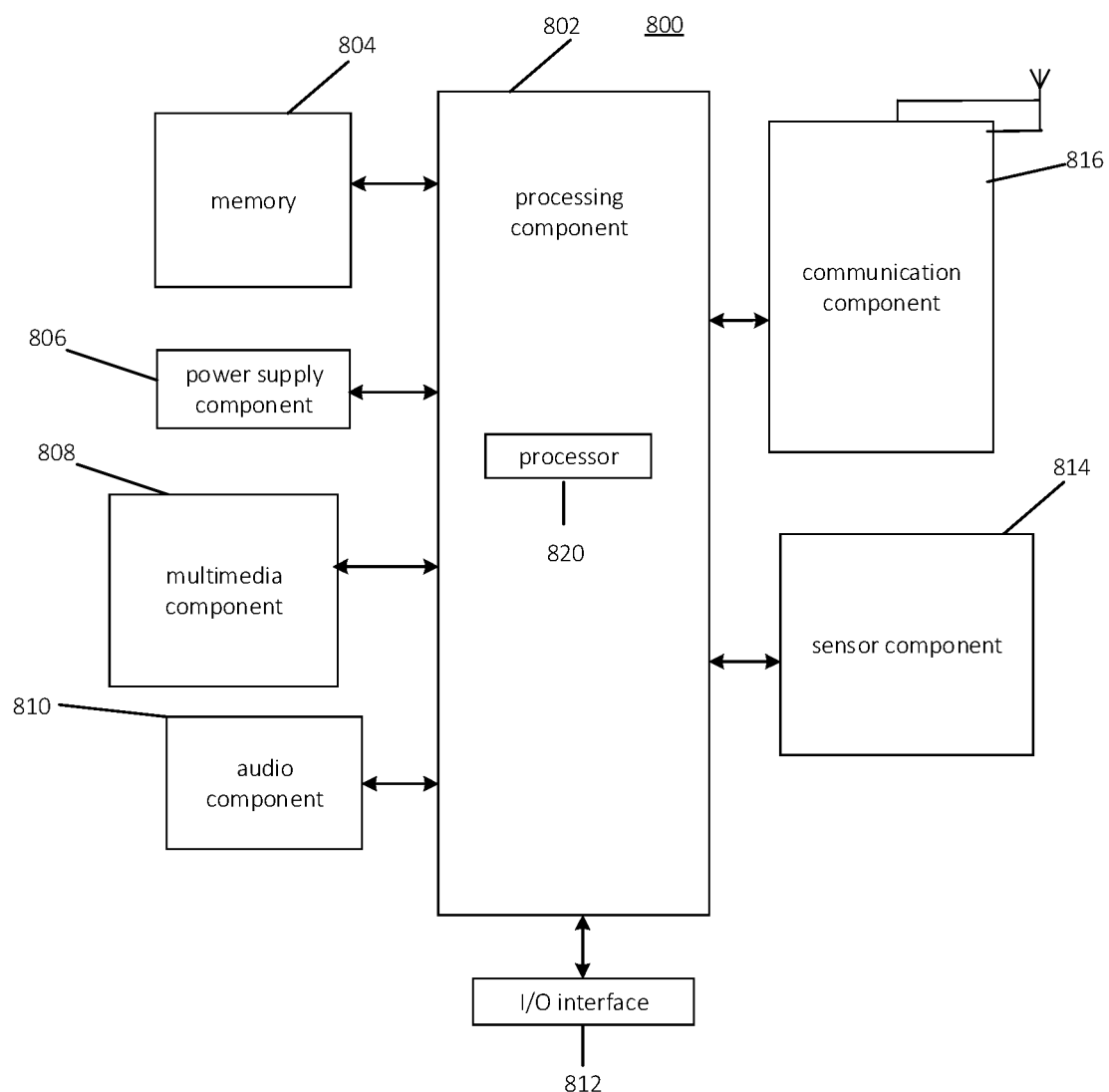
FIG. 6 is a block diagram illustrating an apparatus 800 for communication processing in accordance with an embodiment of the disclosure.

FIG. 6 is a block diagram illustrating an apparatus 800 for communication processing in accordance with an embodiment of the disclosure. For example, the apparatus 800 may be a mobile phone, a computer, a digital broadcast terminal, a messaging device, a game console, a tablet device, a medical device, a fitness device, a personal digital assistant, and the like.

As illustrated in FIG. 6, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operation of the apparatus 800, such as operations associated with display, phone calls, data communications, camera operations, and recording operations. The processing component 802 can include one or more processors 820 to execute instructions to perform all or some of the steps of the methods described above. Additionally, the processing component 802 may include one or more modules that facilitate the interaction between processing component 802 and other components. For example, the processing component 802 may include a multimedia module to facilitate the interaction between the multimedia component 808 and the processing component 802.

The memory 804 is configured to store various types of data to support operations of the apparatus 800. Examples of such data include instructions for operating any application or method on the apparatus 800, contact data, phonebook data, messages, pictures, videos, and the like. The memory 804 may be implemented by any type of volatile or non-volatile storage device or a combination thereof, such as static random access memory (SRAM), electrically erasable programmable read only memory (EEPROM), erasable programmable read only memory (EPROM), programmable read-only memory (PROM), read only memory (ROM), magnetic memory, flash memory, magnetic disk or optical disk.

The power supply component 806 provides power to various components of the apparatus 800. The power supply component 806 may include a power management system, one or more power supplies, and other components associated with generating, managing, and distributing power to the apparatus 800.

The multimedia component 808 includes a screen that provides an output interface between the apparatus 800 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor can sense not only the boundaries of a touch or swipe action, but also the duration and pressure associated with the touch or swipe action. In some embodiments, the multimedia component 808 includes a front-facing camera and/or a rear-facing camera. When the apparatus 800 is in an operation mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 810 is configured to output and/or input audio signals. For example, the audio component 810 includes a microphone (MIC) that is configured to receive external audio signals when the apparatus 800 is in operating modes, such as call mode, recording mode, and voice recognition mode. The microphone is configured to receive external audio signals. The received audio signal may be further stored in the memory 804 or transmitted via the communication component 816. In some embodiments, the audio component 810 also includes a speaker for outputting the audio signals.

The I/O interface 812 is configured to provide an interface between the processing component 802 and a peripheral interface module. The peripheral interface module may be a keyboard, a click wheel, a button, and the like. These buttons may include, but are not limited to, home button, volume buttons, start button, and lock button.

The sensor component 814 includes one or more sensors for providing status assessment of various aspects of the apparatus 800. For example, the sensor component 814 can detect the on/off state of the apparatus 800, the relative positioning of components, such as the display and keypad of the apparatus 800. The sensor component 814 can also detect a change in the position of the apparatus 800 or a component of the apparatus 800, the presence or absence of contact with the apparatus 800, the orientation or acceleration/deceleration of the apparatus 800 and the temperature change of the apparatus 800. The sensor component 814 may include a proximity sensor configured to detect the presence of nearby objects in the absence of any physical contact. The sensor component 814 may also include a light sensor, such as a complementary metal oxide semiconductor (CMOS) or charge-coupled device (CCD) image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as Wi-Fi, 2G or 3G, or a combination thereof. In some examples, the communication component 816 receives broadcast signals or broadcast related information from an external broadcast management system via a broadcast channel. In some examples, the communication component 816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some examples, the apparatus 800 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component implementation for performing the above communication processing method.

In some embodiments, there is also provided a non-transitory computer-readable storage medium including instructions, such as a memory 804 including instructions. The instructions are executable by the processor 820 of the apparatus 800 to perform the above method. For example, the non-transitory computer-readable storage medium may be ROM, random access memory (RAM), CD-ROM, magnetic tape, floppy disk, optical data storage device, and the like.

Figure 7:
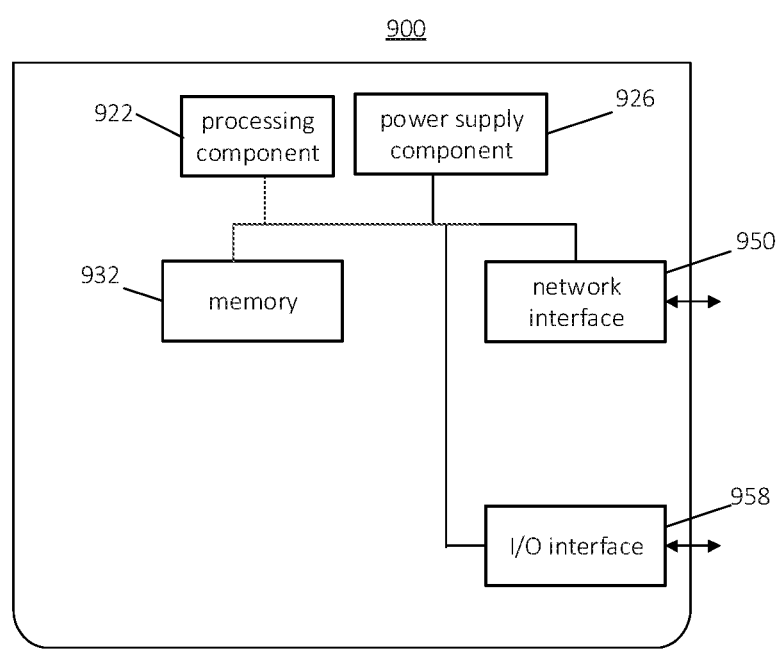
FIG. 7 is a block diagram illustrating an apparatus 900 for communication processing in accordance with an embodiment of the disclosure.

FIG. 7 is a block diagram illustrating an apparatus 900 for communication processing in accordance with an embodiment of the disclosure. For example, the apparatus 900 may be provided as a server. As illustrated in FIG. 7, the apparatus 900 includes a processing component 922 and memory resources represented by the memory 932 for storing instruction. The processing component 922 further includes one or more processor. The instructions may be application programs and can be executed by the processing component 922. The application program stored in the memory 932 may include one or more modules, each corresponding to a set of instructions. Further, the processing component 922 is configured to execute the instructions to perform the foregoing communication processing method.

The apparatus 900 further includes a power component 926 configured to perform power management of the apparatus 900, a wired or wireless network interface 950 configured to connect the apparatus 900 to the network, and an input/output (I/O) interface 958. The apparatus 900 may operate an operating system based on the memory, such as windows Server™, Mac OS X™, Unix™, Linux™, FreeBSD™, or the like.

The technical solutions provided in embodiments of the disclosure can be combined in any ways without conflict.

Other implementations of the disclosure will be readily got by those skilled in the art upon consideration of the specification and practice of the disclosure. This disclosure is intended to cover any variations, uses, or adaptations of embodiments that follow the general principles of the embodiments and include those common design and conventional technical means that are not disclosed herein. The specification and examples are to be regarded as examples only, with the true scope and spirit of embodiments of the disclosure being indicated by the following claims.

It is understandable that the embodiments of the disclosure are not limited to the precise structures described above and illustrated in the accompanying drawings and that various modifications and changes may be made without departing from the scope thereof. The scope of embodiments of the disclosure is limited only by the appended claims.

According to a first aspect of embodiments of the disclosure, there is provided a communication processing method, performed by first user equipment (UE), including:
receiving one or more sets of discontinuous reception (DRX) configuration information; and
monitoring a sidelink resource pool during a running period of a timer of each set of the DRX configuration information.

In some embodiments, the DRX configuration information at least includes at least one of following parameters:
DRX cycle;
duration information of an on-duration timer; and
duration information of an inactivity timer.

In some embodiments, the method further includes starting the on-duration timer at a beginning of the DRX cycle;
in which monitoring the sidelink resource pool during the running period of the timer of each set of the DRX configuration information includes:
monitoring the sidelink resource pool indicated by sidelink resource pool information during the running period of the on-duration timer.

In some embodiments, the DRX configuration information includes duration information of an inactivity timer, sidelink resource pool information, a source identifier and a destination identifier; the duration information of the inactivity timer indicates a running duration of the inactivity timer;
in which the method further includes:
determining a source UE identifier and a destination UE identifier contained in a received signaling; and
starting the inactivity timer in response to determining that the source UE identifier contained in the received signaling corresponds to the source identifier and the destination UE identifier contained in the received signaling corresponds to the destination identifier;
in which monitoring the sidelink resource pool during the running period of the timer of each set of the DRX configuration information includes:
monitoring the sidelink resource pool indicated by the sidelink resource pool information during the running period of the inactivity timer.

In some embodiments, the DRX configuration information includes duration information of an inactivity timer, sidelink resource pool information and a destination identifier; the duration information of the inactivity timer indicates a running duration of the inactivity timer;
in which the method further includes:
determining a destination UE identifier contained in a received signaling; and
starting the inactivity timer in response to determining that the destination UE identifier contained in the received signaling corresponds to the destination identifier;
in which monitoring the sidelink resource pool during the running period of the timer of each set of the DRX configuration information includes:
monitoring the sidelink resource pool indicated by the sidelink resource pool information during the running period of the inactivity timer.

In some embodiments, in which the DRX configuration information includes duration information of an inactivity timer, a source identifier, and sidelink resource pool information; the duration information of the inactivity timer indicates a running duration of the inactivity timer;
in which the method further includes:
determining a source UE identifier contained in a received signaling; and starting the inactivity timer in response to determining that the source UE identifier contained in the received signaling corresponds to the source identifier;

in which monitoring the sidelink resource pool during the running period of the timer of each set of the DRX configuration information includes:

monitoring the sidelink resource pool indicated by the sidelink resource pool information during the running period of the inactivity timer.

In some embodiments, the DRX configuration information includes duration information of an inactivity timer and sidelink resource pool information; the duration information of the inactivity timer indicates a running duration of the inactivity timer; and the DRX configuration information does not include a source identifier or a destination identifier;

In which the method further includes:

determining a destination UE identifier contained in a received signaling; and starting the inactivity timer in response to determining that the destination UE identifier contained in the received signaling corresponds to any one of destination identifiers of the first UE;

in which monitoring the sidelink resource pool during the running period of the timer of each set of the DRX configuration information includes:

monitoring the sidelink resource pool indicated by the sidelink resource pool information during the running period of the inactivity timer.

In some embodiments, in which the DRX configuration information includes duration information of an on-duration timer and duration information of an inactivity timer; the duration information of the on-duration timer indicates a running duration of the on-duration timer, and the duration information of the inactivity timer indicates a running duration of the inactivity timer;

in which monitoring the sidelink resource pool during the running period of the timer of each set of the DRX configuration information includes:

monitoring the sidelink resource pool indicated by sidelink resource pool information during the running periods of the on-duration timer and the inactivity timer, in which the DRX configuration information includes the sidelink resource pool information.

In some embodiments, the DRX configuration information includes duration information of an on-duration timer and duration information of an inactivity timer; the duration information of the on-duration timer indicates a running duration of the on-duration timer, and the duration information of the inactivity timer indicates a running duration of the inactivity timer;

in which monitoring the sidelink resource pool during the running period of the timer of each set of the DRX configuration information includes:

monitoring all configured sidelink resource pools during the running periods of the on-duration timer and the inactivity timer, in which the DRX configuration information does not include sidelink resource pool information.

In some embodiments, the DRX configuration information includes duration information of an inactivity timer, sidelink resource pool information, and sidelink transmission mode information;

in which the method further includes:

starting the inactivity timer in response to determining that a sidelink transmission mode indicated in a received signaling is the same as the sidelink transmission mode indicated by the DRX configuration information;

in which monitoring the sidelink resource pool during the running period of the timer of each set of the DRX configuration information includes:

monitoring the sidelink resource pool indicated by the sidelink resource pool information during the running period of the inactivity timer.

In some embodiments, the sidelink resource pool information is identifier information or resource location information of the one or more sidelink resource pools.

In some embodiments, the received signaling is sidelink control information (SCI).

In some embodiments, the method further includes:

not monitoring the sidelink resource pool in response to determining that the timer is not in a running state.

In some embodiments, the method further includes:

determining that a source identifier and a destination identifier are contained in a the DRX configuration information;

forwarding the DRX configuration information to a third UE in response to determining that the source identifier is an identifier of the third UE and the destination identifier is an identifier of the first UE.

In some embodiments, the method further includes: establishing a sidelink data transmission with the third UE during the running period of the timer.

According to a second aspect of embodiments of the disclosure, there is provided a communication processing method, including:

determining one or more sets of discontinuous reception (DRX) configuration information corresponding to first user equipment (UE); and sending the DRX configuration information to the first UE.

In some embodiments, a timer includes an on-duration timer and/or an inactivity timer.

In some embodiments, the DRX configuration information at least includes at least one of following parameters:

DRX cycle;

duration information of the an on-duration timer; and duration information of an inactivity timer.

In some embodiments, each set of the DRX configuration information at least further includes at least one of following parameters:

one or more source identifiers;

one or more purpose identifiers;

sidelink transmission mode information; and sidelink resource pool information of one or more sidelink resource pools.

According to a third aspect of embodiments of the disclosure, there is provided a communication processing apparatus, applied to first user equipment (UE), including:

a receiving unit, configured to receive one or more sets of discontinuous reception (DRX) configuration information; and a monitoring unit, configured to monitor a sidelink resource pool during a running period of a timer of each set of the DRX configuration information.

According to a fourth aspect of embodiments of the disclosure, there is provided a communication processing device, including:

a configuring unit, configured to determine one or more sets of discontinuous reception (DRX) configuration information corresponding to first user equipment (UE); and a sending unit, configured to send the DRX configuration information to the first UE.

According to a fifth aspect of embodiments of the disclosure, there is provided a communication processing device, including:

a processor; and a memory for storing processor-executable instructions;

in which the processor is configured to perform any one of the above-mentioned communication processing methods performed by the first UE when executing the executable instructions.

According to a sixth aspect of embodiments of the disclosure, there is provided a communication processing device, including:

a processor; and a memory, for storing processor-executable instructions;

in which the processor is configured to perform any one of the above-mentioned communication processing methods performed by the network device or the second UE when executing the executable instructions.

According to a seventh aspect of embodiments of the disclosure, there is provided a computer storage medium, having executable instructions stored thereon, in which when the executable instructions are executed by a processor, the processor is caused to perform above-mentioned communication processing methods performed by the first UE.

According to an eighth aspect of embodiments of the disclosure, there is provided a computer storage medium, having executable instructions stored thereon, in which when the executable instructions are executed by a processor, the processor is caused to perform above-mentioned communication processing methods performed by the network device or the second UE.

The technical solution according to embodiments of the disclosure may include the following beneficial effects.

One or more sets of DRX configuration information are received, and the sidelink resource pool information is monitored during the running period of the timer of each set of the DRX configuration information. Therefore, compared to monitoring the sidelink resource pool all the time, monitoring the sidelink resource pool during the running period of the timer of each set of DRX configuration information can save the power consumption of the first UE.

What is claimed is:

1. A communication processing method, performed by first user equipment (UE), comprising:
   receiving one or more sets of discontinuous reception (DRX) configuration information;
   wherein each set of DRX configuration information comprises duration information of an inactivity timer;
   configuring a running period of the inactivity timer based on the duration information of the inactivity timer;
   in response to determining that the DRX configuration information does not include any source identifier and in response to receiving a signaling containing a destination identifier that is used as a destination UE identifier, starting the inactivity timer and
   monitoring a sidelink resource pool during the running period of the inactivity timer of each set of the DRX configuration information.

2. The method of claim 1, wherein the DRX configuration information further comprises at least one of following parameters:
   DRX cycle; or
   duration information of an on-duration timer.

3. The method of claim 2, further comprising: starting the on-duration timer at a beginning of the DRX cycle;
   monitoring the sidelink resource pool indicated by sidelink resource pool information during a running period of the on-duration timer of each set of the DRX configuration information.

4. The method of claim 2, wherein the DRX configuration information further comprises sidelink resource pool information of one or more sidelink resource pools, and the sidelink resource pool information is identifier information or resource location information of the one or more sidelink resource pools.

5. The method of claim 1, wherein the DRX configuration information further comprises at least one of following information, sidelink resource pool information, a source identifier, or the destination identifier;
   wherein the method further comprises:
   determining a source UE identifier and the destination UE identifier contained in the received signaling; and
   in response to determining that the source UE identifier contained in the received signaling is the same as the source identifier and the destination UE identifier contained in the received signaling is the same as the destination identifier, starting the inactivity timer and
   monitoring the sidelink resource pool indicated by the sidelink resource pool information during the running period of the inactivity timer of each set of the DRX configuration information.

6. The method of claim 5, wherein the received signaling is sidelink control information (SCI).

7. The method of claim 1, wherein the DRX configuration information further comprises, sidelink resource pool information and the destination identifier;
   wherein the method further comprises:
   determining a destination UE identifier contained in the received signaling; and
   in response to determining that the destination UE identifier contained in the received signaling corresponds to the destination identifier, starting the inactivity timer
   and monitoring the sidelink resource pool indicated by the sidelink resource pool information during the running period of the inactivity timer of each set of the DRX configuration information.

8. The method of claim 1, wherein the DRX configuration information further comprises sidelink resource pool information; in response to determining that the DRX configuration information does not include a source identifier or a destination identifier,
   the method further comprises:
   determining the destination UE identifier contained in the received signaling; and
   in response to determining that the destination UE identifier contained in the received signaling corresponds to any one of destination identifiers of the first UE, starting the inactivity timer
   and monitoring the sidelink resource pool indicated by the sidelink resource pool information during the running period of the inactivity timer of each set of the DRX configuration information.

9. The method of claim 1, wherein the DRX configuration information further comprises duration information of an on-duration timer; the duration information of the on-duration timer indicates a running duration of the on-duration timer;
   wherein the method further comprises:
   monitoring the sidelink resource pool indicated by sidelink resource pool information during running periods of the on-duration timer and the inactivity timer of each set of the DRX configuration information, wherein the DRX configuration information comprises the sidelink resource pool information.

10. The method of claim 1, wherein the DRX configuration information further comprises duration information of an on-duration timer; the duration information of the on-duration timer indicates a running duration of the on-duration timer;
wherein the method further comprises:
monitoring all configured sidelink resource pools during running periods of the on-duration timer and the inactivity timer of each set of the DRX configuration information, wherein the DRX configuration information does not comprise sidelink resource pool information.

11. The method of claim 1, wherein the DRX configuration information further comprises sidelink resource pool information, and sidelink transmission mode information;
wherein the method further comprises:
in response to determining that a sidelink transmission mode indicated in a received signaling is the same as the sidelink transmission mode indicated by the DRX configuration information, starting the inactivity timer and monitoring the sidelink resource pool indicated by the sidelink resource pool information during the running period of the inactivity timer of each set of the DRX configuration information.

12. The method of claim 1, further comprising:
not monitoring the sidelink resource pool in response to determining that the timer is not in a running state.

13. The method of claim 1, further comprising:
determining that a source identifier and a destination identifier are contained in the DRX configuration information; and
forwarding the DRX configuration information to a third UE in response to determining that the source identifier is an identifier of the third UE and the destination identifier is an identifier of the first UE.

14. A communication processing method, performed by a network side device, comprising:
determining one or more sets of discontinuous reception (DRX) configuration information corresponding to first user equipment (UE); and
sending the one or more sets of DRX configuration information to the first UE; wherein the DRX configuration information comprises duration information of an inactivity timer and the duration information of the inactivity timer is used by the first UE to configured a running period of the inactivity timer; the DRX configuration information is further configured to indicate the first UE to start the inactivity timer and to monitor a sidelink resource pool during the running period of the inactivity timer of each set of the DRX configuration information in response to determining that the DRX configuration information does not include any source identifier and in response to receiving a signaling containing a destination identifier that is used as a destination UE identifier.

15. The method of claim 14, wherein the DRX configuration information at least comprises at least one of following parameters:
DRX cycle; or
duration information of an on-duration timer.

16. The method of claim 14, wherein each set of the DRX configuration information at least further comprises at least one of following parameters:
one or more source identifiers;
one or more destination identifiers;
sidelink transmission mode information; and
sidelink resource pool information of one or more sidelink resource pools.

17. A communication processing device, comprising:
a processor; and
a memory for storing processor-executable instructions that, when executed by the processor, cause the processor to:
receive one or more sets of discontinuous reception (DRX) configuration information;
wherein each set of DRX configuration information comprises duration information of an inactivity timer;
configure a running period of the inactivity timer based on the duration information of the inactivity timer;
in response to determining that the DRX configuration information does not include any source identifier and in response to receiving a signaling containing a destination identifier that is used as a destination UE identifier, start the inactivity timer and
monitor the sidelink resource pool the running period of the inactivity timer of each set of the DRX configuration information.

18. A communication processing device, comprising:
a processor; and
a memory, for storing processor-executable instructions that, when executed by the processor, cause the processor to:
determine one or more sets of discontinuous reception (DRX) configuration information corresponding to first user equipment (UE);
send the one or more sets of DRX configuration information to the first UE; wherein the DRX configuration information comprises duration information of an inactivity timer and the duration information of the inactivity timer is used by the first UE to configured a running period of the inactivity timer; the DRX configuration information is further configured to indicate the first UE to start the inactivity timer and to monitor a sidelink resource pool during the running period of the inactivity timer of each set of the DRX configuration information in response to determining that the DRX configuration information does not include any source identifier and in response to receiving a signaling containing a destination identifier that is used as a destination UE identifier.

\* \* \* \* \*